United States Patent
Tseng (10) Patent No.: US 8,331,089 B2
(45) Date of Patent: Dec. 11, 2012

(54) PORTABLE ELECTRONIC DEVICE

(75) Inventor: Chen Tseng, Tao Yuan Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 610 days.

(21) Appl. No.: 12/565,047

(22) Filed: Sep. 23, 2009

(65) Prior Publication Data

US 2010/0315764 A1  Dec. 16, 2010

(30) Foreign Application Priority Data

Jun. 15, 2009  (TW) ................................ 98210646 U (51) Int. Cl.
*H05K 5/00* (2006.01)
*H05K 7/00* (2006.01)
(52) U.S. Cl. .............................. 361/679.55; 361/679.58
(58) Field of Classification Search ............. 361/679.55, 361/679.58
See application file for complete search history.

(56) References Cited

U.S. PATENT DOCUMENTS 7,463,482 B2 * 12/2008 Chien et al. .............. 361/679.55

* cited by examiner

*Primary Examiner* — Anthony Haughton
(74) *Attorney, Agent, or Firm* — McClure, Qualey & Rodack, LLP (57) ABSTRACT

A portable electronic device includes a first body, a second body, a rotating member and a covering member. The second body is connected to the first body and comprises an opening. The rotating member is rotatably disposed in the second body between a first position and a second position. When the rotating member is in the first position, the rotating member is exposed outside of the second body through the opening, and when the rotating member is in the second position, the rotating member is hidden in the second body. The covering member is connected to the rotating member and disposed in the second body between a third position and a fourth position. When the rotating member is in the first position, the covering member is in the third position, and when the rotating member is in the second position, the covering member is in the fourth position.

17 Claims, 8 Drawing Sheets

PORTABLE ELECTRONIC DEVICE

This Application claims priority of Taiwan Patent Application No. 098210646, filed on Jun. 15, 2009, the entirety of which is incorporated by reference herein.

BACKGROUND OF THE INVENTION

1. Field of the Invention

The invention relates to a portable electronic device, and in particular, to a portable electronic device comprising a hidden pad.

2. Description of the Related Art

Figure 1:
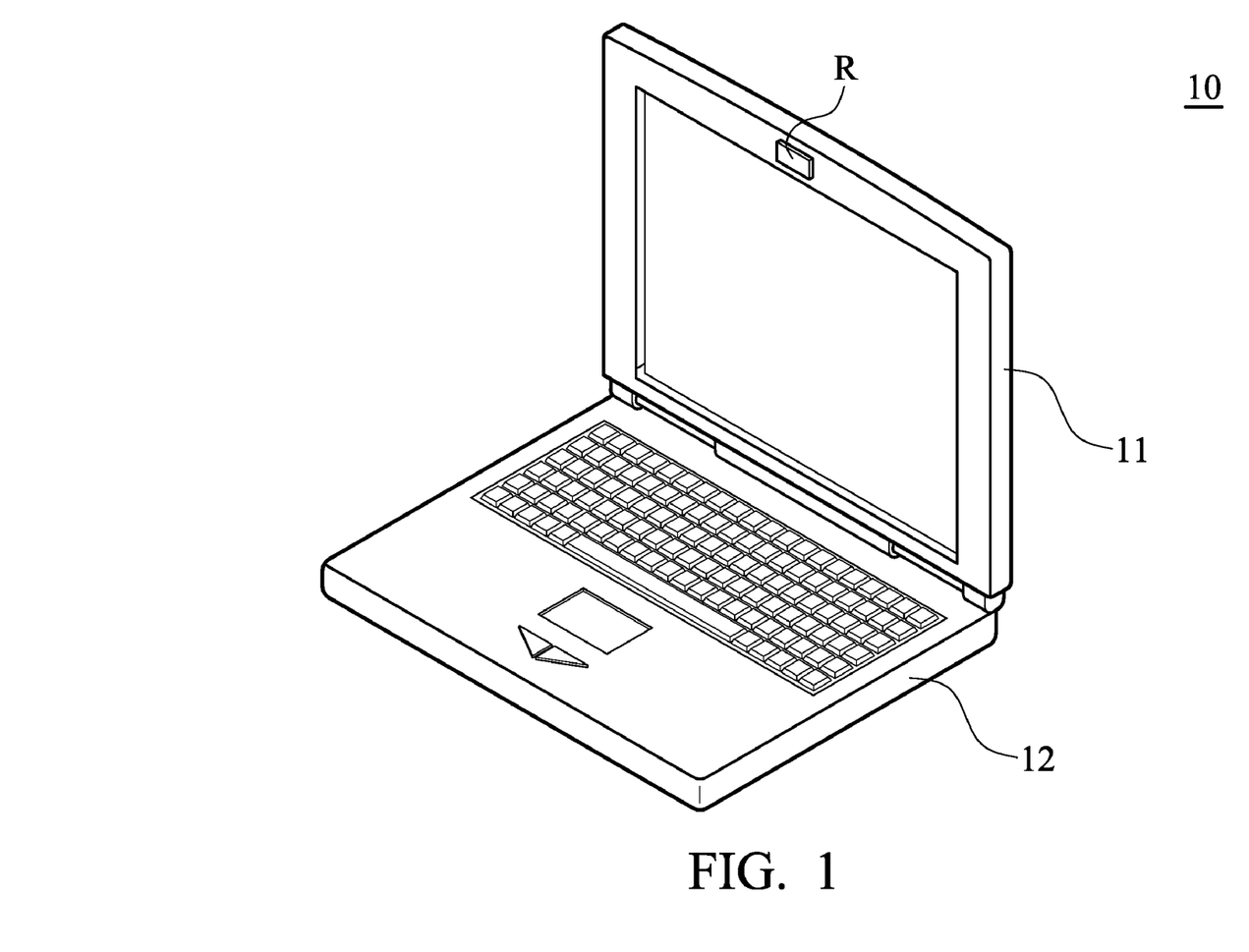
FIG. 1 is a schematic view of a conventional portable computer.

Referring to FIG. 1, the conventional portable computer 10 comprises a display panel 11 and a main body 12. The display panel 11 closes and opens relative to the main body 12 for storage and usage, respectively. When the display panel 11 is closed relative to the main body 12, the conventional portable computer 10 is convenient to carry. A rubber pad R is usually disposed on the periphery of the display panel 11 to avoid collision between the display panel 11 and the main body 12 when the display panel 11 is closed relative to the main body 12. However, the rubber pad R protrudes from the exterior surface of the display panel 11, affecting overall esthetic appearance.

BRIEF SUMMARY OF THE INVENTION

Accordingly, the invention provides a portable electronic device. A portable electronic device comprises a first body, a second body, a rotating member and a covering member. The second body is connected to the first body and comprises an opening. The rotating member is rotatably disposed in the second body between a first position and a second position. When the rotating member is in the first position, the rotating member is exposed outside of the second body through the opening, and when the rotating member is in the second position, the rotating member is hidden in the second body. The covering member is connected to the rotating member and disposed in the second body between a third position and a fourth position. When the rotating member is in the first position, the covering member is in the third position, and when the rotating member is in the second position, the covering member is in the fourth position.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 2A:
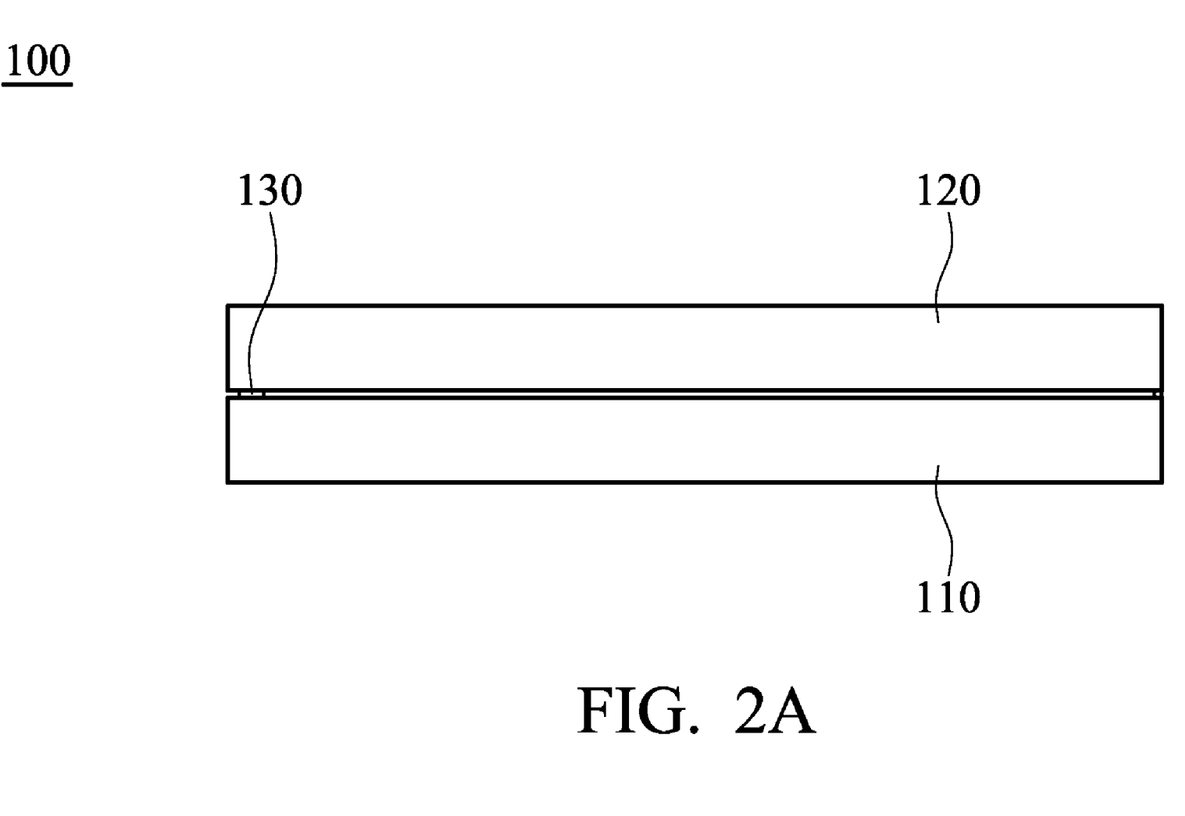
FIGS. 2A and 2B are schematic views of a portable electronic device of the invention showing a opened position and a closed position.
Figure 2B:
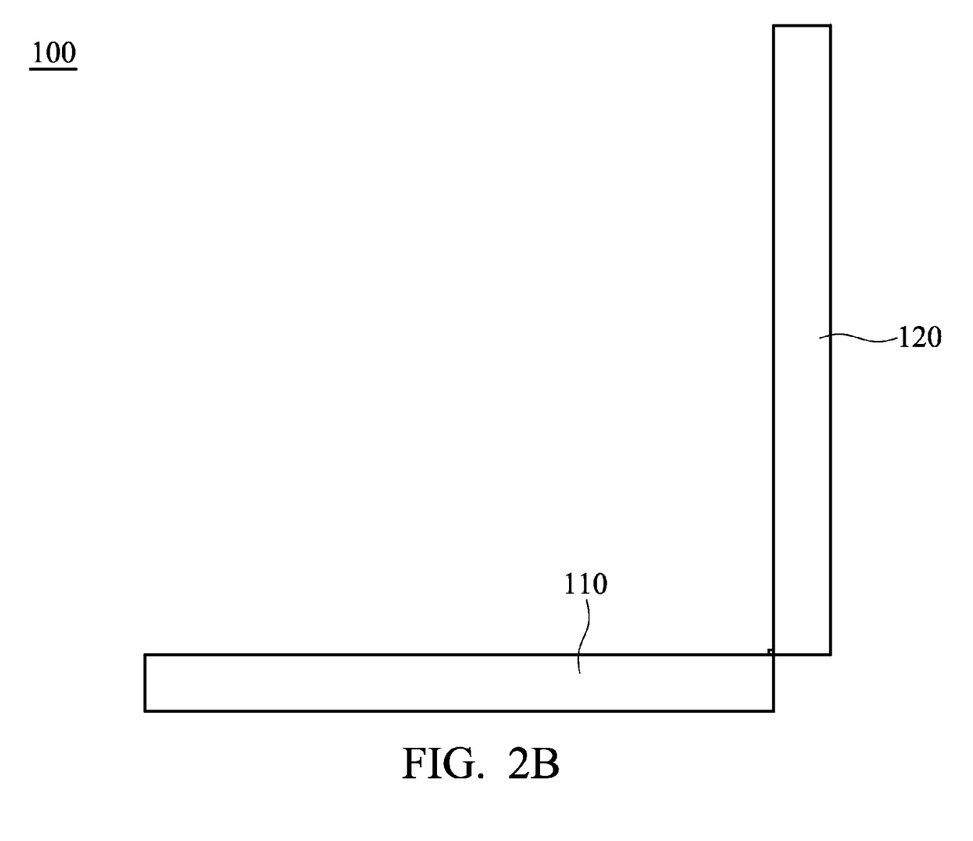

As shown in FIGS. 2A and 2B, the electronic device 100 of the invention is a portable computer, comprising a first body 110, a second body 120 and a rotating member 130. It should be mentioned that the electronic device of the invention is not limited to portable computer. It could be any kind of electronic device which requires operation to open or close the first body relative to the second body by a rotating axle.

The first body 110 is a main body of the portable computer, whereby a keyboard and a touch panel is provided. The second body 120 is a cover of the portable computer, whereby a display screen is provided. The second body 120 has an opening A (as shown in FIGS. 3A-3C) formed above the display screen.

When the electronic device 100 is in a closed position, the second body 120 and first body 110 (as shown in FIG. 2A) are relatively closed, and the rotating member 130 is exposed outside of the second body 120 through the opening A to abut the first body 110 (as shown in FIG. 2A), thus providing a buffering function between the first body 110 and the second body 120.

When the electronic device 100 is in an open position, the second body 120 is relatively opened to the first body 110 (as shown in FIG. 2B), and the rotating member 130 is hidden within the second body 120 (as shown in FIG. 2B).

Figure 3A:
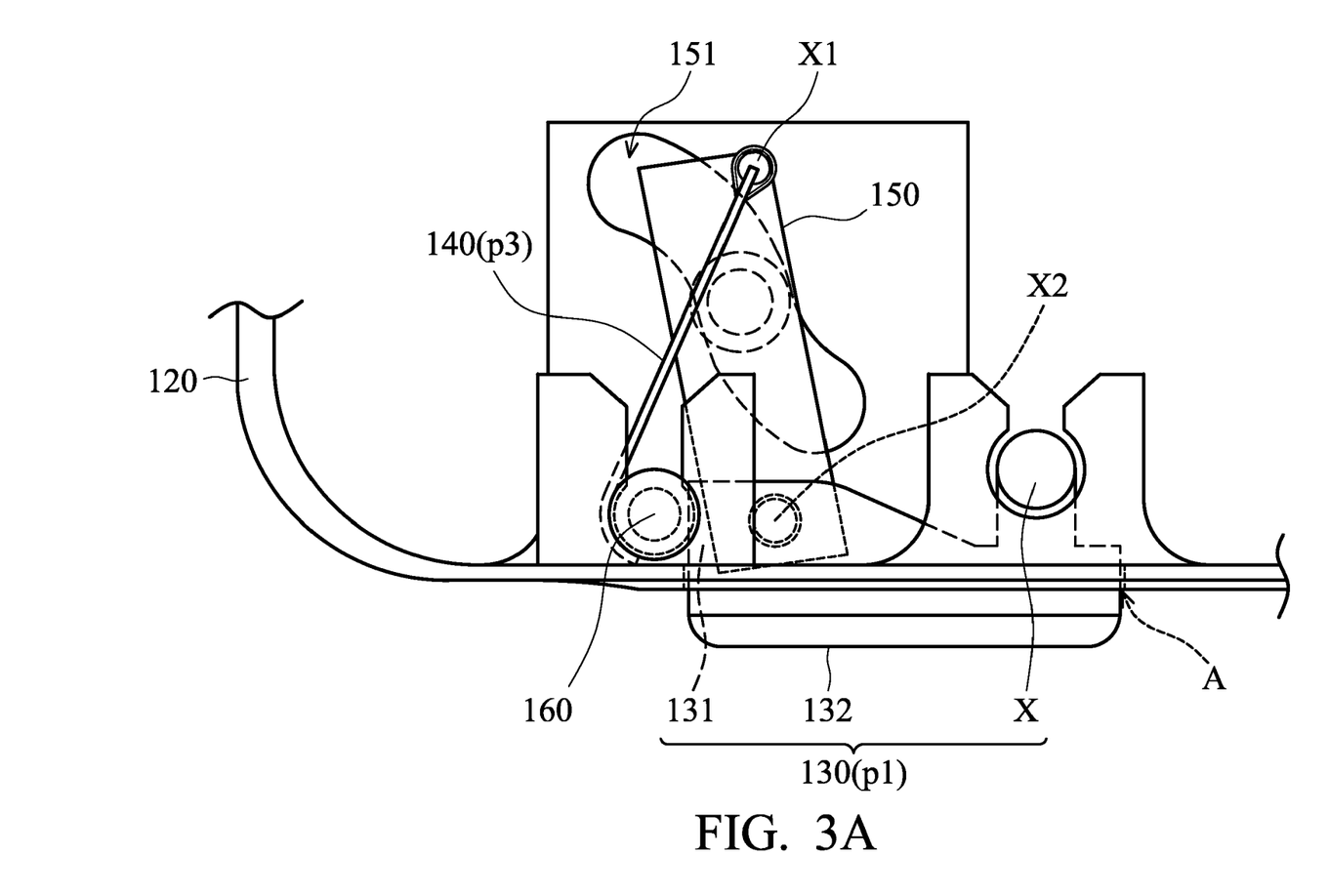
FIGS. 3A to 3C are schematic views showing the continuous operation of a rotating member, a covering member and a linking member of the portable electronic device.
Figure 3B:
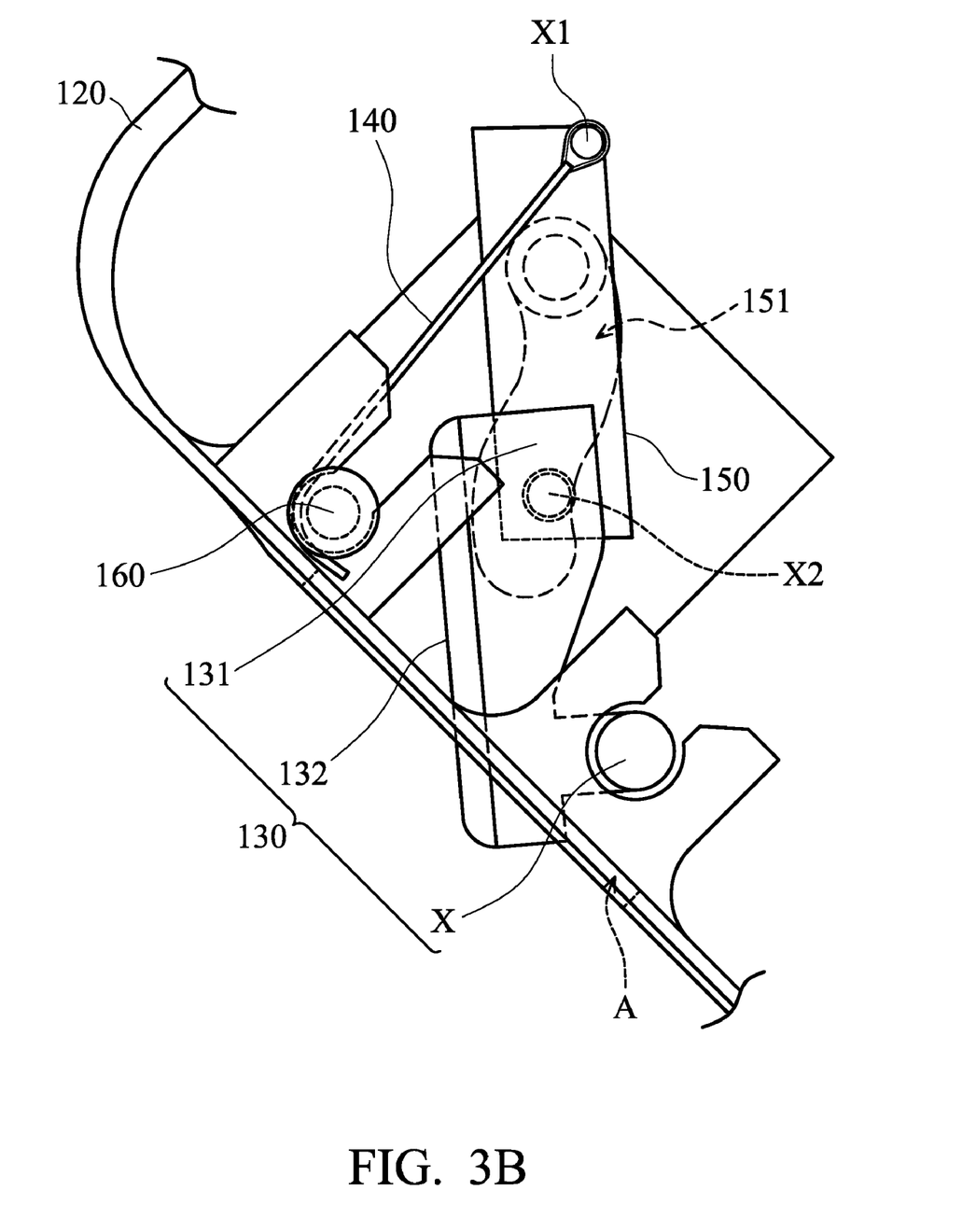
Figure 3C:
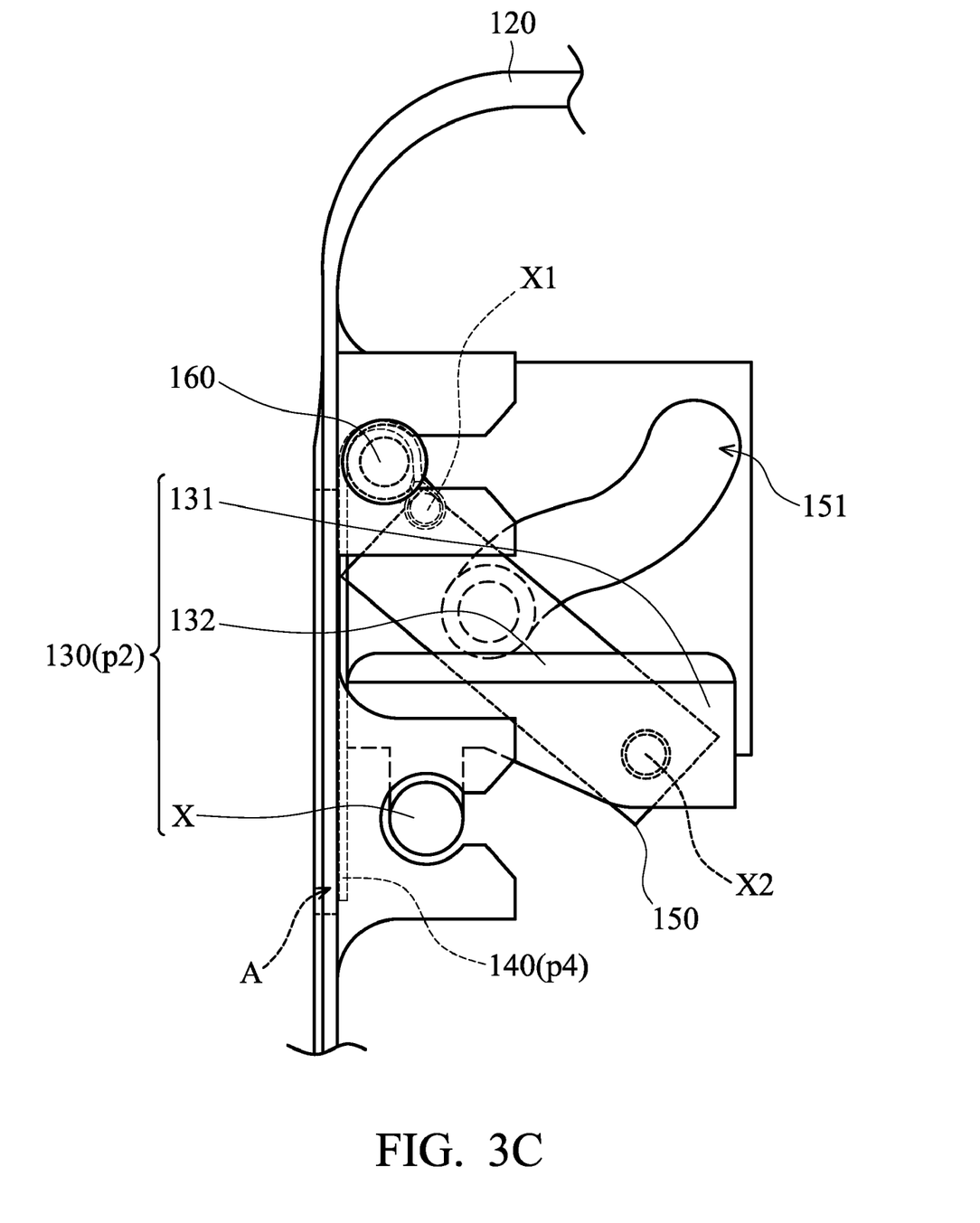

Referring to FIGS. 3A to 3C, the rotating member 130 is rotatably disposed in the second body 120 between a first position p1 (as shown in FIG. 3A), and a second position p2 (as shown in FIG. 3C) and comprises an end portion 131, an abutting surface 132, and a rotating axle X, wherein a weight is applied to the end portion 131. The rotating member 131 connects with the second body 120 by the rotating axle X and rotates around the rotating axle X between the first position p1 and the second position p2. When the rotating member 130 is in the first position p1, the abutting surface 132 of the rotating member 130 is exposed outside of the second body 120 through the opening A to sufficiently provide a buffering function. When the rotating member 130 is in the second position p2, the rotating member 130 is hidden in the second body 120. In a variant embodiment, the rotating member 130 is of elastic material, such as rubber, and has the ability to buffer collision between the first body 110 and the second body 120. In another variant embodiment, only the abutting surface 132 of the rotating member 130 is of elastic material, such as rubber, and has the ability of buffer collision between the first body 110 and the second body 120.

The portable electronic device 100 further comprises a covering member 140, a linking member 150 and a limiting member 160. The covering member 140, of flexible material (such as Mylar or nonwoven fabric), is movably disposed in the second body 120 between a third position p3 (as shown in FIG. 3A) and a fourth position p4 (as shown in FIG. 3C). When the rotating member 130 is in the first position p1, the covering member 140 is in the third position p3, hidden in the second body 120, and when the rotating member 130 moves from the first position p1 to the second position p2, the covering member 140 moves from the third position p3 to the fourth position p4 accordingly, corresponding to the opening A and covering the opening A to achieve an aesthetic appearance.

The linking member 150 slides along a track 151 on the second body 120, and connects the rotating member 130 and the covering member 140 by an axle X2 and an axle X1, respectively. When the rotating member 130 is rotated between the first position p1 and the second position p2, by sliding the linking member 150 in the track 151, the covering member 140 is able to move from the third position p3 to the fourth position p4.

Figure 4A:
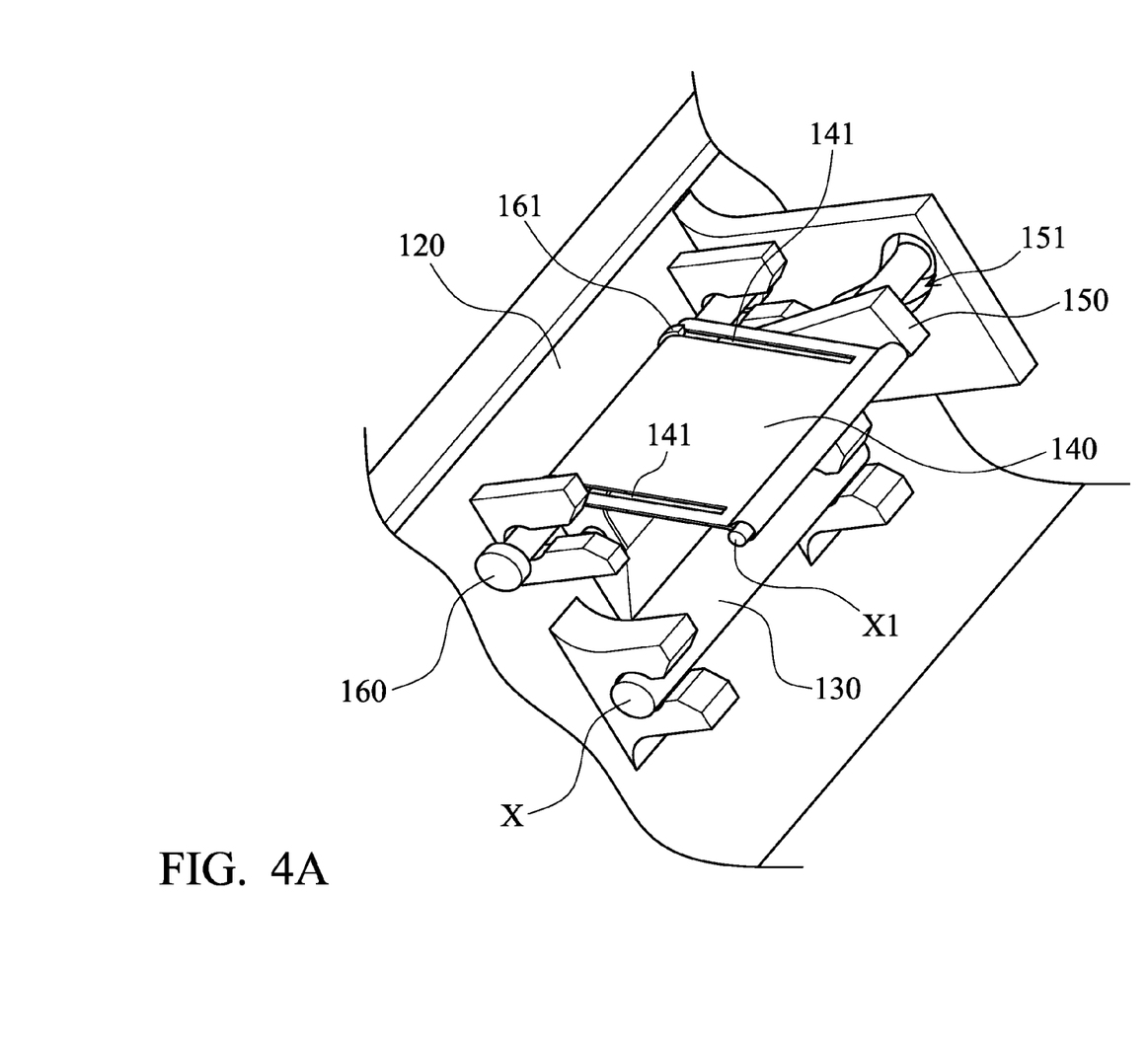
FIG. 4A is a schematic view showing the rotating member in a first position and the covering member in a third position.
Figure 4B:
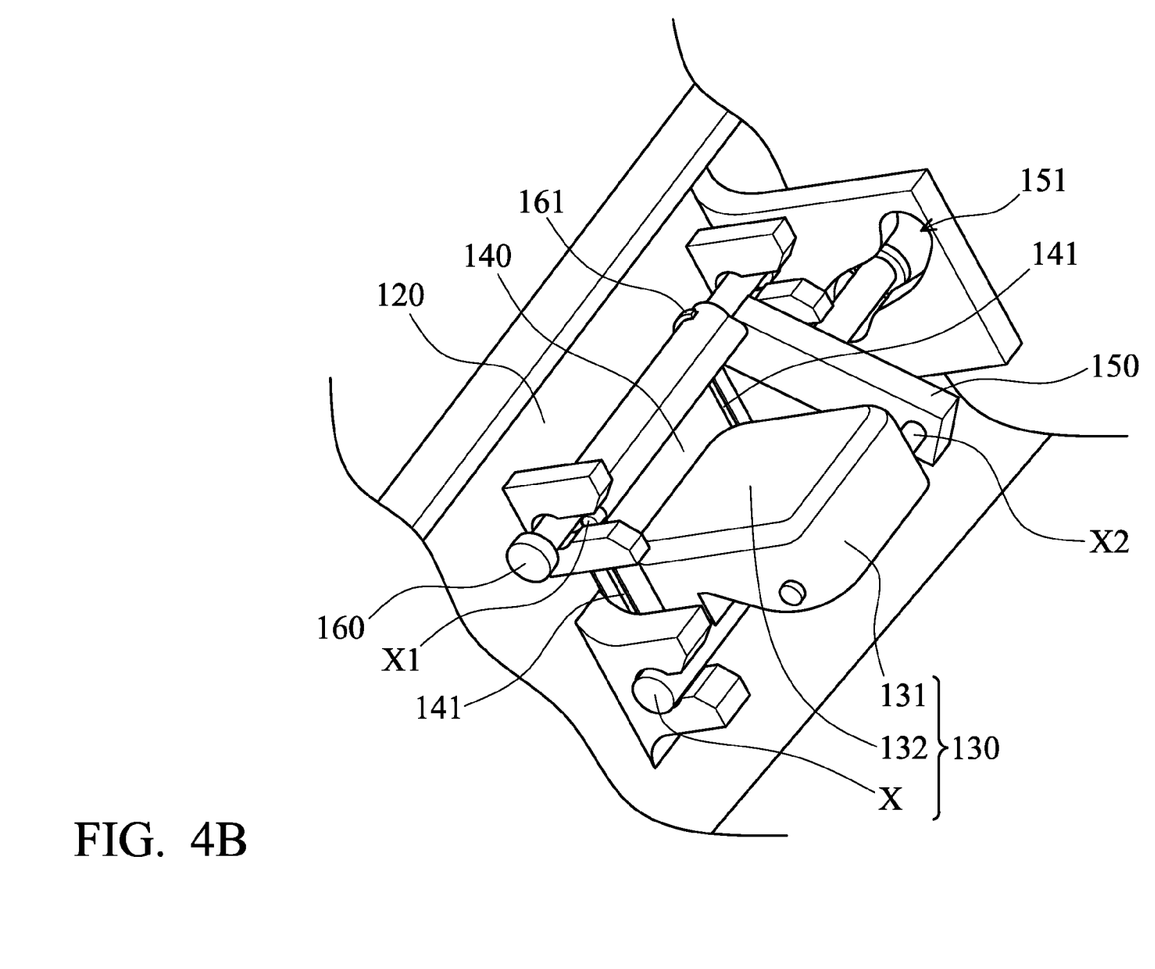
FIG. 4B is a schematic view showing the rotating member in a second position and the covering member in a fourth position.

Referring to FIG. 4A and FIG. 4B simultaneously, the limiting member 160, disposed in the second body 120, comprises two protrusions 161. The covering member 140 comprises two grooves 141 on two sides of the covering member 140. The two protrusions 161 are limited to move along the two grooves 141, which in turns to limit the moving direction of the covering member 140.

Referring to FIGS. 3A to 3C again, when the user lifts up the second body 120 to activate the rotation of the rotating member 130 from the closed position, i.e. the rotating member 130 in the first position p1 (the abutting surface 132 of the rotating member 130 abuts the first body 110 through the opening A), and the covering member 140 is in the third position p3 (the covering member 140 is hidden in the second body 120), the rotating member 130 rotates from the first position p1 to the second position p2 (the continuous motion thereof is shown in FIGS. 3A to 3C) to be hidden in the second body 120 by the gravity force and the weight of the end portion 131 of the rotating member 130. Additionally, during the rotation of the rotating member 130 from the first position p1 to the second position p2, the covering member 140 is moved thereby through the linking member 150 from the third position p3 to the fourth position p4 (the continuous motion thereof is shown in FIGS. 3A to 3C) to cover the opening A. It should be noted that in FIG. 3B, the second body 120 slanted about 45 degrees is for better understanding to show the structural movement therein at a specific moment during the rotation relatively to the first body 110, which is not to used to limit the degrees.

In a variant embodiment, the covering member 140 has a decorative surface. When the covering member 140 covers the opening A, the decorative surface is exposed outside of the second body 120 through the opening A to match the appearance of the second body 120, increasing various looks of the portable electronic device 100.

In the portable electronic device 100, the elastic abutting surface 132 abuts the first body 110 through the opening A when the second body 120 and the first body 110 are relatively closed to provide a buffering function therebetween.

When the second body 120 and the first body 110 are relatively opened, the rotating member 130 is not viewable through the opening A, instead the covering member 140, parallel with the second body 120, is viewable, thus increasing the aesthetic appearance of the portable electronic device 100 while providing a conventional buffering function.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:
a first body;
a second body connected to the first body and comprising an opening;
a rotating member rotatably disposed in the second body between a first position and a second position, wherein when the rotating member is in the first position, the rotating member is exposed outside of the second body through the opening, and when the rotating member is in the second position, the rotating member is hidden in the second body; and
a covering member movably connected to the second body and disposed in the second body between a third position and a fourth position, wherein when the rotating member is in the first position, the covering member is in the third position, when the rotating member is in the second position, the covering member is in the fourth position, when the covering member is in the third position, the covering member is hidden in the second body, and when the covering member is in the fourth position, the covering member corresponds to and covers the opening.

2. The portable electronic device as claimed in claim 1, wherein the rotating member has an abutting surface, and when the rotating member is in the first position, the abutting surface is exposed outside of the second body and abuts the first body.

3. The portable electronic device as claimed in claim 2, wherein the rotating member comprises an end portion, and a weight is applied to the end portion.

4. The portable electronic device as claimed in claim 3, further comprising a linking member connected to the rotating member and the covering member, wherein when the rotating member rotates, the covering member is moved by the linking member.

5. The portable electronic device as claimed in claim 4, further comprising a limiting member disposed in the second body, wherein the limiting member comprises a protrusion, the covering member comprises a groove, and the protrusion moves in the groove to limit a moving direction of the covering member.

6. The portable electronic device as claimed in claim 5, wherein when the first body and the second body are relatively closed, the rotating member is in the first position and abuts the first body, and when the first body and the second body are relatively opened, the rotating member moves from the first position to the second position.

7. The portable electronic device as claimed in claim 6, wherein the covering member has a decorative surface corresponding to the opening, and when the covering member is in the fourth position, the decorative surface is exposed outside of the second body through the opening.

8. The portable electronic device as claimed in claim 7, wherein the abutting surface is of elastic material.

9. The portable electronic device as claimed in claim 1, wherein the covering member has a decorative surface corresponding to the opening, and when the covering member is in the fourth position, the decorative surface is exposed outside of the second body through the opening.

10. The portable electronic device as claimed in claim 1, wherein the rotating member comprises an end portion, and a weight is applied to the end portion.

11. The portable electronic device as claimed in claim 1, wherein when the first body and the second body are relatively closed, the rotating member is in the first position and abuts the first body.

12. The portable electronic device as claimed in claim 11, wherein when the first body and the second body are relatively opened, the rotating member moves from the first position to the second position.

13. The portable electronic device as claimed in claim 1, further comprising a linking member connected the rotating member and the covering member, wherein when the rotating member rotates, the covering member is moved by the linking member.

14. The portable electronic device as claimed in claim 1, further comprising a limiting member disposed in the second body, wherein the limiting member comprises a protrusion, the covering member comprises a groove, and the protrusion moves in the groove to limit moving direction of the covering member.

15. The portable electronic device as claimed in claim 1, wherein the abutting surface is of elastic material.

16. The portable electronic device as claimed in claim 1, wherein the covering member is of flexible material.

17. The portable electronic device as claimed in claim 16, wherein the covering member comprises Mylar or nonwoven fabric.

* * * * *